July 10, 1923.
F. F. DORSEY
DAMPING DEVICE FOR INSTRUMENTS
Filed Nov. 19, 1921
1,461,381
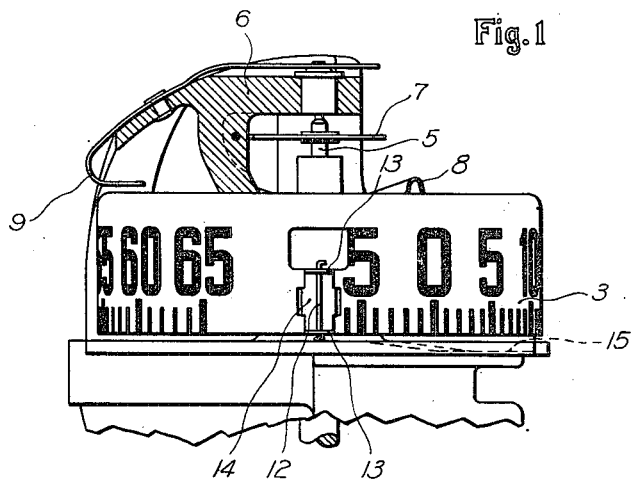
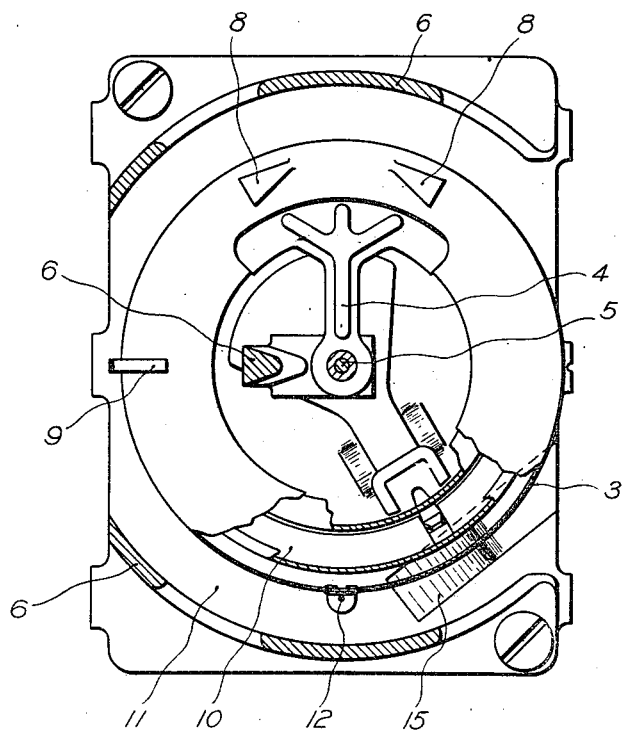
Inventor
Farnum F. Dorsey Patented July 10, 1923.

1,461,381

UNITED STATES PATENT OFFICE.

FARNUM F. DORSEY, OF ROCHESTER, NEW YORK, ASSIGNOR TO NORTH EAST ELECTRIC COMPANY, OF ROCHESTER, NEW YORK, A CORPORATION OF NEW YORK.

DAMPING DEVICE FOR INSTRUMENTS.

Application filed November 19, 1921. Serial No. 516,431.

*To all whom it may concern:*

Be it known that I, FARNUM F. DORSEY, a citizen of the United States, residing at Rochester, in the county of Monroe and State of New York, have invented certain new and useful Improvements in Damping Devices for Instruments; and I do hereby declare the following to be a full, clear, and exact description of the invention, such as will enable others skilled in the art to which it appertains to make and use the same.

This invention relates to instruments, such as speedometers, in which an indication of the speed, or other characteristic to be measured, is afforded by a rotatable indicator.

In instruments of the type in question it is usual to control the indicator by means of a spring, and to so mount it as to eliminate friction in its movements as far as practicable. Consequently, since the inertia of the indicator is large in proportion to the forces acting on it, the indicator tends, when subjected to sudden changes in the actuating force, to swing beyond the correct position and to reach this position only after a series of oscillations of diminishing magnitude. Various devices for damping out such swings or for securing what is called a "dead-beat" action, have been proposed, some of such devices depending upon the opposition of friction to the movements of the indicator.

The principal object of the present invention is to provide an instrument, such as a speedometer, with a damping-device of simple construction, acting on the frictional principle, and particularly to so arrange the device that it will act independently of friction in the pivotal bearings of the indicator. To this end a damping-device in the form of a frictional drag is used, this device being actuated by the indicator but being supported by a stationary friction-surface over which it is moved by the indicator.

A further object of the invention is to relieve the indicator from the effect of the damping-device when near its zero position, so as to permit the indicator to return with certainty to this position. To this end the stationary friction surface is interrupted so as to cause disengagement of the drag and the surface at the said position of the indicator.

In the accompanying drawings Fig. 1 is a side-elevation of a portion of an instrument embodying the present invention, showing particularly the indicator and the damping-device; and Fig. 2 is a plan view of the same structure, with the damping-device shown in horizontal section.

The invention is illustrated as embodied in a speedometer of the magnetic type, in which the rotary indicator comprises a cylindrical skirt 3 which is graduated to indicate miles per hour. This skirt is supported by an arm 4 fixed to a vertical staff or axis 5, turning through part of a revolution in bearings in a stationary frame 6. The movements of the indicator are controlled, in the usual manner, by a hair-spring 7, and limited by stop-lugs 8 cooperating with a stationary stop-member 9.

Movement of the indicator is produced by the action of a magnet 10 rotatable within the skirt 3, but the particular form and operation of the magnetic system need not be herein described, as they have no bearing on the present invention.

The frame 6 is provided with a flat surface 11 normal to the axis of the indicator, and the damping-device characteristic of this invention comprises a drag-member cooperating with and supported by this surface. The drag-member may have various forms, but as shown in the drawings it is a metal pin 12, supported by engagement of its lower end with the friction surface, and movable vertically in two perforated lugs 13 projecting from a plate 14 fixed to the skirt 3. The pin is provided with a convex head on its lower end, to afford a suitable surface for engagement with the friction surface, and the upper end of the pin is bent to one side to act as a stop and limit the downward movement of the pin.

The indicator is shown, in the drawings, as moved away from zero position, and it will be apparent that the pin will act as a drag to damp movement in either direction. A recess 15 is formed in the frame, however, so located that the pin will be over it when the indicator is near zero position, the pin being supported, at this time, by its bent upper end and being free at its lower end.

Since the pin 12, when in operation, is supported by the friction-surface, no unbalanced pressure is imposed on the pivotal bearings of the indicator, and the action of the device does not vary with changes in the adjustment or lubrication or other conditions in the bearings. While the sliding pin specifically described constitutes a simple, inexpensive and reliable embodiment of the invention, it will be apparent that the invention is susceptible of other embodiments within the scope of the following claims.

The invention claimed is:

1. The combination, with the rotary indicator of a speedometer or the like, and a stationary surface adjacent thereto, of a damping device comprising a frictional drag connected with and moved by the indicator but sliding upon and supported by said stationary surface.

2. The combination, with the rotary indicator of a speedometer or the like, provided with a peripheral depending flange, and a frame-member having a surface below the indicator and substantially normal to the axis thereof, of a damping-device connected with and moved by said flange of the indicator but sliding upon and supported by said surface.

3. The combination, with the rotary indicator of a speedometer or the like, and a frame-member having a surface below the indicator and substantially normal to the axis thereof, of a damping-device comprising a guide on the indicator and a pin slidable in said guide but engaging and supported, at its lower end, by said surface so as to be dragged by rotary movement of the indicator.

4. The combination, with the rotary indicator of a speedometer or the like, of a frame-member having a friction-surface below the indicator and substantially normal to the axis thereof, and a damping-device in the form of a frictional drag connected with and moved by the indicator but sliding upon and at times supported by said surface; the surface being cut away to interrupt engagement with the damping-device when the indicator is near its zero position.

FARNUM F. DORSEY.